US012707246B2

(12) United States Patent
Lv et al.

(10) Patent No.: US 12,707,246 B2
(45) Date of Patent: Aug. 11, 2026

(54) DEVICE DISCOVERY AND REGISTRATION METHOD AND NETWORK-SIDE DEVICE

(71) Applicant: VIVO MOBILE COMMUNICATION CO., LTD., Chang'an Dongguan (CN)

(72) Inventors: Huazhang Lv, Chang'an Dongguan (CN); Xiaowan Ke, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 745 days.

(21) Appl. No.: 18/107,719

(22) Filed: Feb. 9, 2023

(65) Prior Publication Data

US 2023/0199468 A1 Jun. 22, 2023

Related U.S. Application Data

(63) Continuation of application No. PCT/CN2021/112073, filed on Aug. 11, 2021.

(30) Foreign Application Priority Data

Aug. 12, 2020 (CN) ......................... 202010808820.9

(51) Int. Cl.
*H04W 4/02* (2018.01)
*H04W 8/00* (2009.01)
(Continued)

(52) U.S. Cl.
CPC ............. *H04W 8/005* (2013.01); *H04W 8/02* (2013.01); *H04W 60/04* (2013.01)

(58) Field of Classification Search
CPC ................................ H04W 8/005; H04W 4/02
See application file for complete search history.

(56) References Cited

U.S. PATENT DOCUMENTS

2018/0192471 A1* 7/2018 Li ......................... H04W 80/10
2019/0261260 A1 8/2019 Dao et al.
(Continued)

FOREIGN PATENT DOCUMENTS

CN 110086652 A 8/2019
CN 110167003 A 8/2019
(Continued)

OTHER PUBLICATIONS

Huawei et al., "Local NEF Selection and Reselection for Network Information Provisioning with low latency," SA WG2 Meeting #136AH, S2-2000654, pp. 1-2, (Jan. 13-17, 2020).
(Continued)

*Primary Examiner* — Barry W Taylor
(74) *Attorney, Agent, or Firm* — Foley & Lardner LLP

(57) ABSTRACT

This application discloses a device discovery and registration method, and a network-side device. The device discovery method includes: receiving, by a first communication device, first information sent by a second communication device, where the first information includes at least one of first location information of a to-be-discovered local device and information about a first application; and sending, by the first communication device, first notification information to the second communication device, where the first notification information is used to notify of information about a discovered local device.

10 Claims, 8 Drawing Sheets

(51) Int. Cl.
*H04W 8/02* (2009.01)
*H04W 60/04* (2009.01)

(56) References Cited

U.S. PATENT DOCUMENTS

| | | | | |
|---|---|---|---|---|
| 2020/0351985 | A1 | 11/2020 | Zhu et al. | |
| 2021/0274392 | A1* | 9/2021 | Dao | H04W 36/0033 |
| 2023/0032185 | A1* | 2/2023 | Lee | H04L 61/4511 |

FOREIGN PATENT DOCUMENTS

| | | | |
|---|---|---|---|
| CN | 110719303 | A | 1/2020 |
| CN | 110769412 | A | 2/2020 |
| CN | 110972090 | A | 4/2020 |
| EP | 3 720 160 | A1 | 10/2020 |
| WO | 2019/001376 | A1 | 1/2019 |
| WO | 2019/197426 | A1 | 10/2019 |

OTHER PUBLICATIONS

"3rd Generation Partnership Project; Technical Specification Group Services and System Aspects; Procedures for the 5G System (5GS); Stage 2 (Release 16)," 3GPP TS 23.502, V16.4.0, pp. 1-582, (Mar. 2020).

Huawei et al., "KI#1: New Sol: NF and service discovery between SNPN and separate entity," 3GPP TSG-WG SA2 Meeting #139E e-meeting, S2-2003884, pp. 1-3, (Jun. 1-12, 2020).

Extended European Search Report dated Nov. 24, 2023 as received in Application No. 21855571.2.

Huawei et al., "Solution for the KI#3: Network Information Provisioning to EAS with low latency," 3GPP TSG-WG SA2 Meeting #139E e-meeting, S2-2004119 (revision of S2-200xxxx), pp. 1-4, (Jun. 1-12, 2020).

Huawei et al., "Solution for the KI#3: Network Information Provisioning to EAS with low latency," 3GPP TSG-WG SA2 Meeting #139E e-meeting, S2-2004432 (revision of S2-2004119rev03), pp. 1-5, (Jun. 1-12, 2020).

Vivo., "KI#3, Sol#49: Update to support L-NEF selection and relocation," SA WG2 Meeting #140E, S2-2005244, pp. 1-6, (Aug. 19-Sep. 1, 2020).

International Search Report and Written Opinion of the International Searching Authority dated Nov. 15, 2021 as received in Application No. PCT/CN2021/112073.

CN Office Action dated Aug. 2, 2022 as received in Application No. 202010808820.9.

EP Office Action on EP Appl. No. 21855571.2 dated Jul. 14, 2025 (9 pages).

* cited by examiner

DEVICE DISCOVERY AND REGISTRATION METHOD AND NETWORK-SIDE DEVICE

CROSS-REFERENCE TO RELATED APPLICATIONS

This application is a continuation application of International Application No. PCT/CN2021/112073 filed on Aug. 11, 2021, which claims priority to Chinese Patent Application No. 202010808820.9, filed on Aug. 12, 2020 in China, which is incorporated herein by reference in its entirety.

TECHNICAL FIELD

This application pertains to the field of communication technologies, and specifically relates to a device discovery and registration method and a network-side device.

BACKGROUND

In some communication scenarios, local quality of service (QoS) monitoring information usually needs to be reported. Currently, an existing QoS reporting mechanism is as follows: An application function (AF) performs QoS monitoring reporting to a network exposure function (NEF). However, the NEF is deployed at a high layer, usually the same as other core network elements, resulting in slow reporting of local QoS monitoring information. Therefore, how a local NEF network element is discovered is an urgent problem to be resolved.

SUMMARY

Embodiments of this application are intended to provide a device discovery and registration method and a network-side device.

To resolve the foregoing technical problem, this application is implemented as follows:

According to a first aspect, a device discovery method is provided, including: receiving, by a first communication device, first information sent by a second communication device, where the first information includes at least one of first location information of a to-be-discovered local device and information about a first application; and sending, by the first communication device, first notification information to the second communication device, where the first notification information is used to notify of information about a discovered local device.

According to a second aspect, a device discovery method is provided, including: sending, by a second communication device, first information to a first communication device, where the first information includes at least one of first location information of a to-be-discovered local device and information about a first application; and receiving, by the second communication device, first notification information sent by the first communication device, where the first notification information is sent by the first communication device in response to the first information, and the first notification information is used to notify of information about a discovered local device.

According to a third aspect, a device registration method is provided, including: sending, by a local device, second information to a first communication device, where the second information includes at least one of second location information of a to-be-registered local device or information about a second application; and receiving, by the local device, a second notification information sent by the first communication device, where the second notification information is sent by the first communication device in response to the second information, and the second notification information is used to notify that the local device has been registered.

According to a fourth aspect, a device discovery apparatus is provided, applied to a first communication device and including: a first receiving module, configured to receive first information sent by a second communication device, where the first information includes at least one of first location information of a to-be-discovered local device the information about the first application; and a second sending module, configured to send first notification information to the second communication device, where the first notification information is used to notify of the information about a discovered local device.

According to a fifth aspect, a device discovery apparatus is provided, applied to a second communication device and including: a third sending module, configured to send first information to a first communication device, where the first information includes at least one of first location information of a to-be-discovered local device the information about the first application; and a third receiving module, configured to receive first notification information sent by the first communication device, where the first notification information is sent by the first communication device in response to the first information, and the first notification information is used to notify of information about a discovered local device.

According to a sixth aspect, a device registration apparatus is provided, applied to a local device and including: a fourth sending module, configured to send second information to a first communication device, where the second information includes at least one of second location information of a to-be-registered local device and information about a second application; and a fourth receiving module, configured to receive a second notification information sent by the first communication device, where the second notification information is sent by the first communication device in response to the second information, and the second notification information is used to notify that the local device has been registered.

According to a seventh aspect, a network-side device is provided, where the network-side device includes a processor, a memory, and a program or instructions stored on the memory and capable of running on the processor, and when the program or instructions are executed by the processor, the steps of the method according to the first aspect, the second aspect, or the third aspect are implemented.

According to an eighth aspect, a readable storage medium is provided, where a program or instructions are stored in the readable storage medium, and the program or instructions are executed by a processor to implement the steps of the method according to the first aspect, the steps of the method according to the second aspect, or the steps of the method according to the third aspect.

According to an ninth aspect, a chip is provided, where the chip includes a processor and a communication interface, the communication interface is coupled to the processor, and the processor is configured to run a network-side device program or instructions to implement the method according to the first aspect, the method according to the second aspect, or the method according to the third aspect.

In the embodiments of this application, the second communication device may send the first information to the first communication device, where the first information includes at least one of the first location information of the to-bediscovered local device and the information about the first application, so that the first communication device can discover the local device based on the first information. For example, the NRF can discover a corresponding local device (L-NEF) based on first information sent by the NEF, thereby implementing discovery of the local device, and resolving the problem of lack of a local NEF network element discovery manner in the prior art.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application and without creative efforts shall fall within the protection scope of this application.

The terms “first”, “second”, and the like in this specification and claims of this application are used to distinguish between similar objects rather than to describe a specific order or sequence. It should be understood that a number used in this way may be interchangeable in an appropriate case, so that the embodiments of this application can be implemented in a sequence other than those shown or described herein. Objects distinguished by “first” and “second” are usually of one type, and a quantity of objects is not limited. For example, a first object may be one, or may be a plurality. In addition, in the specification and the claims, “and/or” represents at least one of the connected objects, and the character “/” usually represents an “or” relationship between the associated objects.

It should be noted that the technology described in embodiments of this application is not limited to a long term evolution (LTE)/LTE-advanced (LTE-A) system, and may also be used in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms “system” and “network” in the embodiments of this application are often used interchangeably. The described technology may be used in the foregoing system and radio technology, or may be used in another system and radio technology. However, in the following descriptions, a new radio (NR) system is described for an illustration purpose, and NR terms are used in most of the following descriptions. These technologies may also be applied to other applications than an NR system application, such as $6^{th}$ generation (6G) communication systems.

Figure 1:
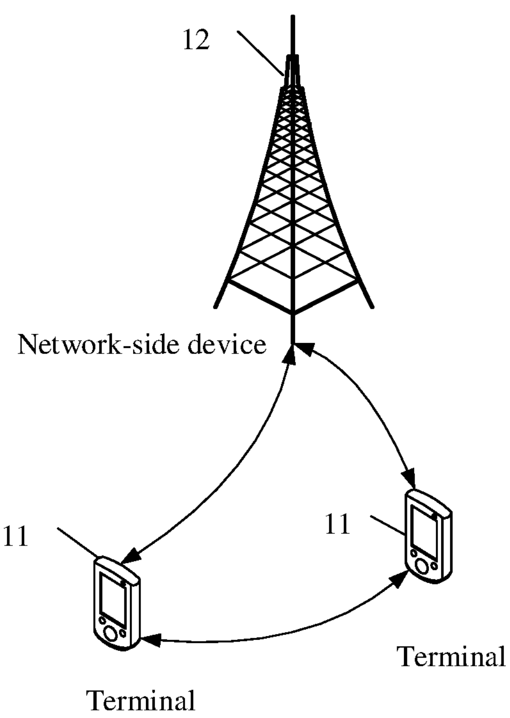
FIG. 1 is a block diagram of a wireless communication system to which embodiments of this application are applicable.

FIG. 1 is a block diagram of a wireless communication system to which embodiments of this application are applicable. The wireless communication system includes a terminal 11 and a network-side device 12. The terminal 11 may also be referred to as a terminal device or a user equipment. The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes: a smart band, earphones, glasses, and the like. It should be noted that a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a node B, an evolved node B (eNB), a home NodeB, a home evolved NodeB, a WLAN access point, a Wi-Fi node, a transmission-reception point (TRP), or another suitable term in the field. Provided that a same technical effect is achieved, the base station is not limited to a specific technical term. It should be noted that in the embodiments of this application, only a base station in an NR system is used as an example, but a specific type of the base station is not limited.

With reference to the accompanying drawings, the following describes in detail the device discovery method provided in the embodiments of this application by using a specific embodiment and an application scenario thereof.

Figure 2:
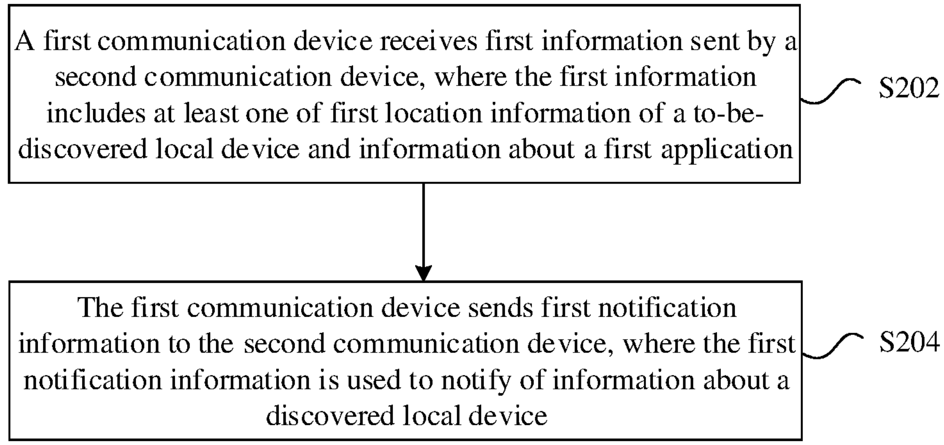
FIG. 2 is a first flowchart of a device discovery method according to an embodiment of this application.

An embodiment of this application provides a device discovery method. FIG. 2 is a first flowchart of a device discovery method according to an embodiment of this application. As shown in FIG. 2, the method includes the following steps.

Step S202: A first communication device receives first information sent by a second communication device, where the first information includes at least one of first location information of a to-be-discovered local device and information about a first application.

Step S204: The first communication device sends first notification information to the second communication device, where the first notification information is used to notify of the information about a discovered local device.

In an optional implementation of this embodiment of this application, the first communication device in the embodiments of this application includes a network repository function (NRF);

the second communication device in this embodiment of this application includes at least one of the following: a network exposure function (NEF), a session management function (SMF), and a policy control function (PCF); and the local device in this embodiment of this application includes at least one of the following: a local network exposure function (L-NEF), a local session management function (L-SMF), or a local policy control function (L-PCF).

Optionally, the first information in this embodiment of this application includes at least one of the following: first location information and information about a first application.

The first location information includes at least one of the following: location information of a terminal, location information of an application server, location information of an application function (AF), and service area information.

The information about the first application in this embodiment of this application is information of an application service requested for providing.

It can be learned that the second communication device may send the first information to the first communication device, where the first information includes at least one of the first location information of the to-be-discovered local device and the information about the first application, so that the first communication device can discover the local device based on the first information. For example, the NRF can discover a corresponding local device (L-NEF) based on first information sent by the NEF, thereby implementing discovery of the local device. In this way, a problem of lack of local NEF network element discovery manners in the prior art is resolved.

Therefore, in a specific application scenario, a local device such as an L-NEF, an L-SMF, or an L-PCF can be discovered based on this application. Therefore, when QoS monitoring status needs to be reported, the AF can initiate QoS monitoring reporting to a discovered L-NEF instead of initiating QoS monitoring reporting to the NEF, thereby speeding up the QoS monitoring reporting.

Figure 3:
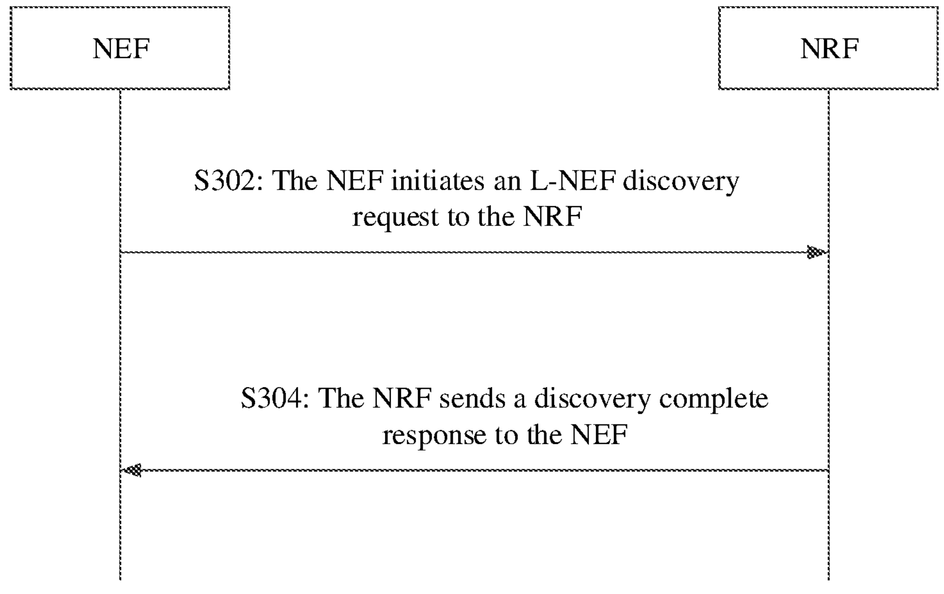
FIG. 3 is a schematic flowchart of a local NEF discovery method according to an embodiment of this application.

For the foregoing local device/local network element discovery process, a specific application scenario may be a discovery process shown in FIG. 3. As shown in FIG. 3, the local device/local network element discovery includes the following steps:

Step S302: The NEF initiates an L-NEF discovery request (Nnrf_NFDiscovery Request) to the NRF.

The discovery request includes first location information and information about a first application. The first location information includes at least location information of a terminal, location information of an application server, and location information of an AF. The information about the first application includes at least a fully qualified domain name (FQDN) of the application, an IP (internet protocol) address of the application, an ID (identity) of the application, and a description of the application.

Step S304: The NRF selects a proper L-NEF based on a location parameter and the information about the application that are sent by the NEF and a location and service application information of the L-NEF, and sends an Nnrf_NFDiscovery Response to the NEF.

The response includes an IP address of the L-NEF, an FQDN of the L-NEF, and an instance ID of the L-NEF.

In an optional implementation of the embodiment of this application, the method of this embodiment of this application may further include the following steps.

Step S206: The first communication device receives second information sent by a local device, where the second information includes at least one of second location information of a to-be-registered local device and information about a second application.

Step S208: The first communication device sends second notification information to the local device, where the second notification information is used to notify that the to-be-registered local device has been registered.

Through the steps S206 and S208, the local device may send the second information to the first communication device, so as to perform registration of the local device. In a specific application scenario, registration with the L-NEF by the NRF can be implemented, that is, registration with the local network element is implemented.

Optionally, the second information in this embodiment of this application includes at least one of the following: second location information and information about a second application.

The second location information is location information of the local device; and the information about the second application is information about an application service provided by the local device.

It should be noted that the information about the first application and the information about the second application in this embodiment of this application each include at least one of the following: an FQDN of an application, an IP address of the application, an ID of the application, and a description of the application.

In addition, the second location information and the location information of the terminal in this embodiment of this application each include at least one of the following: a data network access identity (DNAI), a tracking area (TA), a cell identity (Cell ID), a geographic zone identifier (geographic zone identifier(s)), or a location criteria validity condition (Location Criteria Validity Conditions).

In an embodiment of this application, the method of this embodiment of this application may further include the following step.

Step S210: Determine a to-be-discovered local device from the registered local device based on the first information and the second information. Specifically, the to-be-discovered local device may be determined by matching the first information with the second information. To be specific, the first location information of the determined to-be-discovered local device matches the second location information in the second information, for example, location information of an application server or AF of the to-be-discovered local device matches that in the second information; and/or the determined information about a first application of the to-be-discovered local device matches the information about the second application in the second information, for example, an FQDN or ID of the to-be-discovered local device matches that in the second information.

Figure 4:
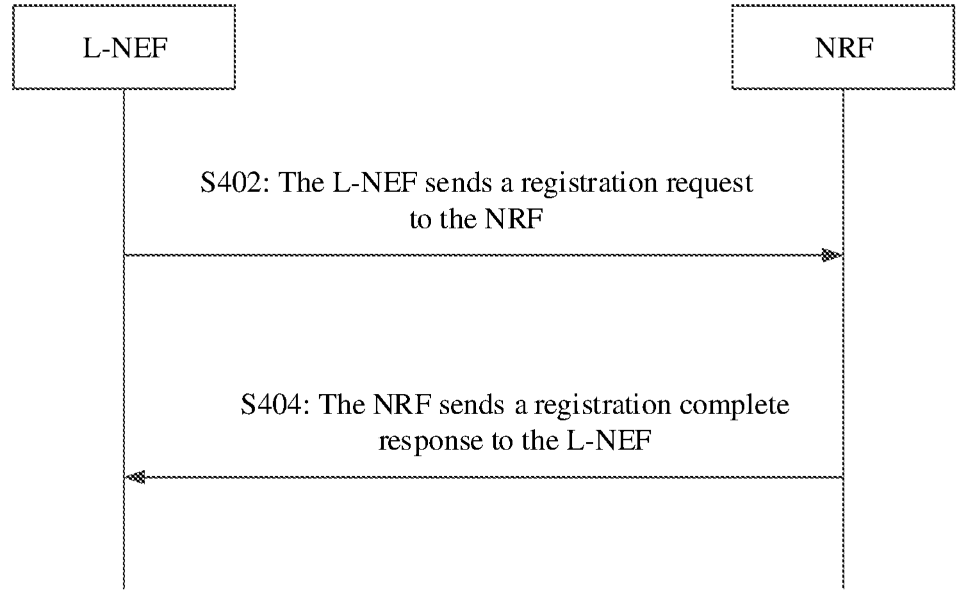
FIG. 4 is a schematic flowchart of a local NEF registration method according to an embodiment of this application.

The foregoing local device/local network element registration process may be a registration process shown in FIG. 4 in a specific application scenario. As shown in FIG. 4, the local device/local network element registration includes the following steps.

Step S402: The L-NEF sends a registration request Nnrf_NFManagement_NFRegister to the NRF.

The registration request includes a parameter: location information. The location information includes: a DNAI, a TA, a Cell ID, and Location Criteria Validity Conditions.

Step S404: The NRF receives the registration request from the L-NEF, and registers the L-NEF. After the registration is completed, a registration complete response is sent to the L-NEF.

The foregoing describes this application from the perspective of the first communication device, and the following describes the device discovery method of this application from the perspective of the second communication device.

Figure 5:
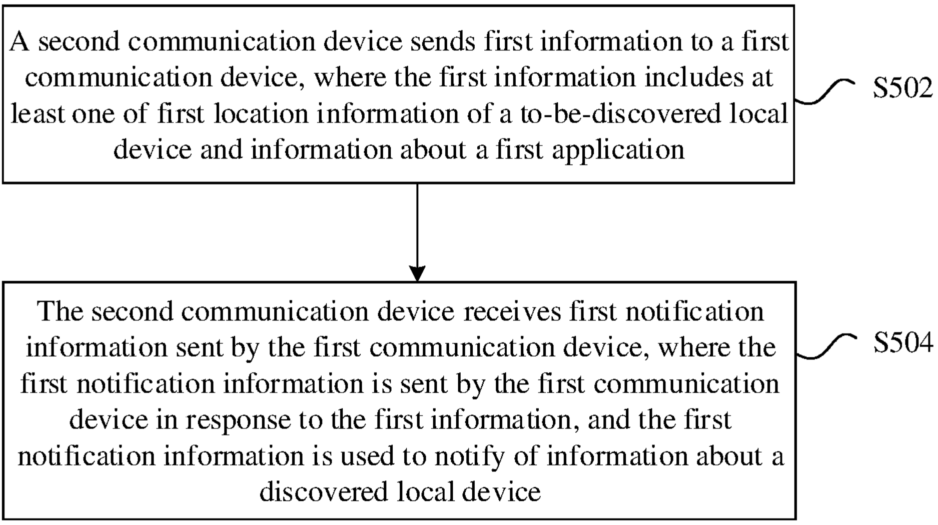
FIG. 5 is a second flowchart of a device discovery method according to an embodiment of this application.

FIG. 5 is a second flowchart of a device discovery method according to an embodiment of this application. As shown in FIG. 5, the method includes the following steps.

Step S502: The second communication device sends first information to a first communication device, where the first information includes at least one of first location information of a to-be-discovered local device and information about a first application.

Step S504: The second communication device receives first notification information sent by the first communication device, where the first notification information is sent by the first communication device in response to the first information, and the first notification information is used to notify of information about a discovered local device.

Through the foregoing steps S502 and S504, the second communication device can send the first information to the first communication device, so as to discover the local device that matches the first information.

Optionally, the first information in this embodiment of this application includes at least one of the following: first location information and information about a first application. The first location information includes at least one of the following: location information of a terminal, location information of an application server, location information of an AF, and service area information. The information about the first application is information about an application service requested for providing.

Optionally, the information about the first application in this embodiment of this application includes at least one of the following: an FQDN of an application, an IP address of the application, an ID of the application, and a description of the application. The location information of the terminal includes at least one of the following: a DNAI, a TA, a cell identity, a geographical zone identifier, and a location criteria validity condition. The location information of the application server includes a DNAI.

Figure 6:
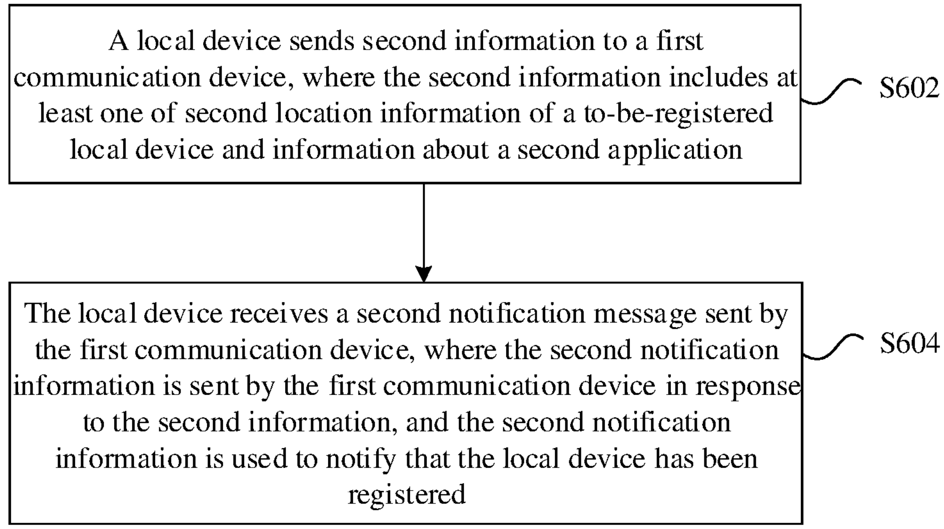
FIG. 6 is a flowchart of a device registration method according to an embodiment of this application.

With respect to the device registration method in this embodiment of this application, for a local device, the method includes the following steps, as shown in FIG. 6.

Step S602: The local device sends second information to a first communication device, where the second information includes at least one of second location information of a to-be-registered local device and information about a second application.

Step S604: The local device receives a second notification information sent by the first communication device, where the second notification information is sent by the first communication device in response to the second information, and the second notification information is used to notify that the local device has been registered.

Optionally, the second information in this embodiment of this application includes at least one of the following: second location information and information about a second application.

The second location information is location information of the local device, and the information about the second application is information about an application service provided by the local device.

Optionally, the information about the second application in this embodiment of this application includes at least one of the following: an FQDN of an application, an Internet protocol (IP) address of the application, an identifier (ID) of the application, and a description of the application. The second location information includes at least one of the following: a DNAI, a TA, a cell identity, a geographical zone identifier, and a location criteria validity condition.

With reference to the QoS monitoring procedure in this embodiment of this application, the following uses an example to describe registration and discovery of the local device in the embodiments of this application.

Figure 7:
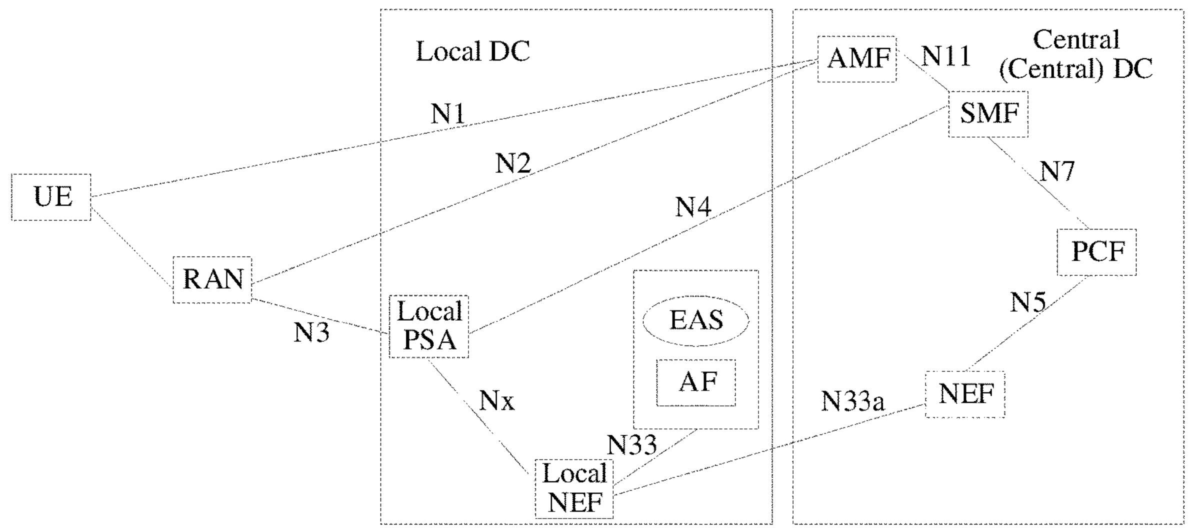
FIG. 7 is a schematic structural diagram of a network for deploying an L-NEF on a local DC according to an embodiment of this application.
Figure 8:
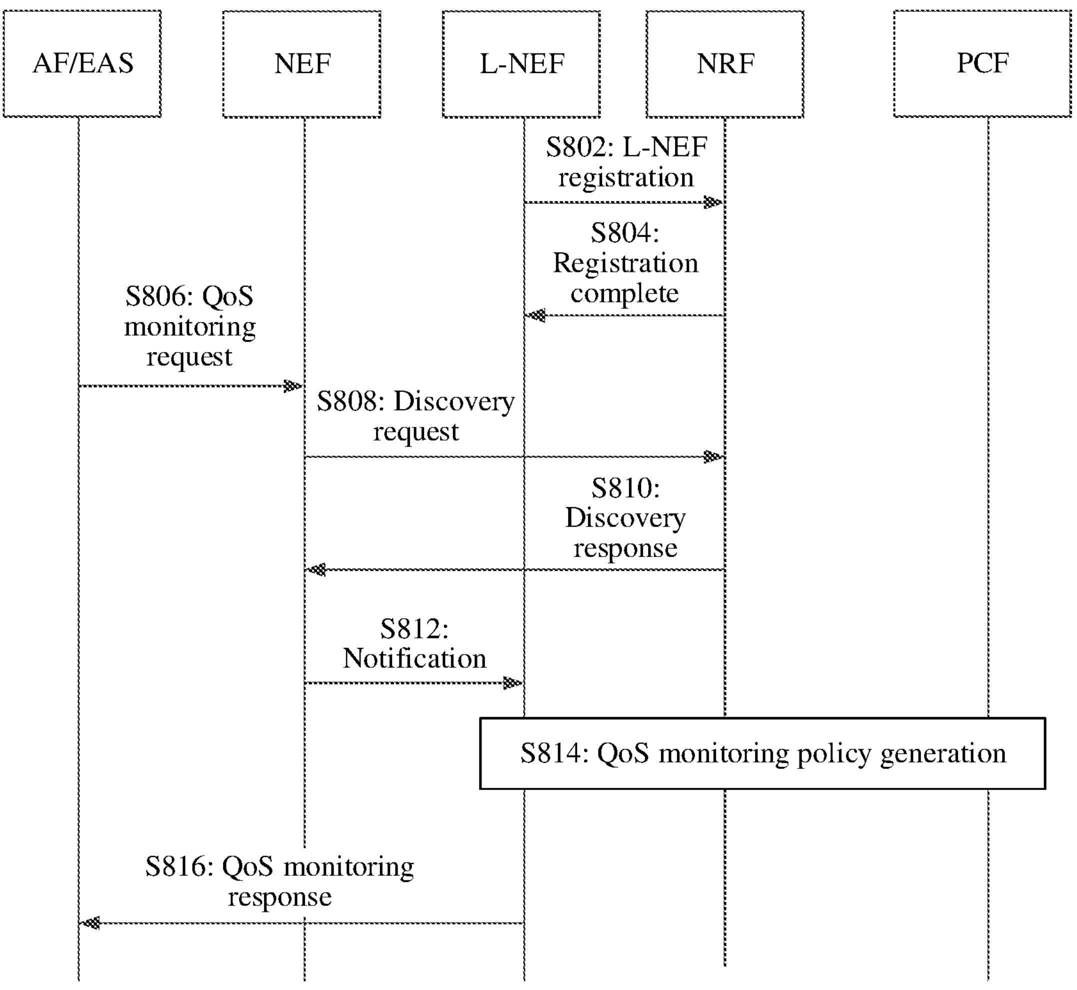
FIG. 8 is a flowchart of QoS monitoring according to an embodiment of this application.

In this specific application scenario, to quickly report local QoS monitoring status in an edge computing scenario, a network structure in which an L-NEF is deployed in a local DC is proposed. As shown in FIG. 7, an AF/EAS (edge application server) can directly initiate QoS monitoring reporting to a local NEF, and obtain feedback of real-time QoS from a protocol data unit PDU session anchor (PSA) over an Nx interface. Specifically, as shown in FIG. 8, a QoS monitoring initiation procedure includes the following steps.

Step S802: The L-NEF sends a registration request Nnrf_NFManagement_NFRegister request to the NRF.

The registration request includes second location information and information about a second application.

The second location information includes: a DNAI, an IP address of the L-NEF, an FQDN of the L-NEF, and an instance ID of the L-NEF.

The information about a second application includes an FQDN of an application, an IP address of the application, an ID of the application, and a description of the application.

Step S804: The NRF receives the registration request from the L-NEF, and registers the L-NEF. After the registration is completed, a registration complete response is sent to the L-NEF.

Step S806: The AF/EAS sends a QoS monitoring request Nnef_AFsessionWithQoS Notify to the NEF.

The request includes: an uplink/downlink data packet delay, a user plane round-trip delay, and location information of an AF/EAS such as DNAI and APP-related information.

Step S808: The NEF receives the QoS monitoring request, and the NEF determines whether the L-NEF has been locally configured. If the L-NEF has been locally configured, step S812 is performed. If the L-NEF has not been locally configured, the NEF sends an L-NEF discovery request Nnrf_NFDiscovery Request to the NRF.

The request includes first location information and information about a first application. The first location information includes at least one of the following: location information of a terminal, location information of an application server, and location information of an AF. The information about the first application includes at least one of the following: an application FQDN, an application IP address, an application ID, or an application description.

Step S810: The NRF selects, according to a location parameter and application information that are sent by the NEF, a proper L-NEF based on location information and the application information and a location and service application information of the L-NEF, and sends an Nnrf_NFDiscovery Response to the NEF.

The response includes an IP address of the L-NEF, an FQDN of the L-NEF, and an instance ID of the L-NEF.

Step S812: The NEF sends an Nnef_EventExposure_Notify to the selected L-NEF, to notify that the L-NEF is selected as a local AF/EAS capability exposure network element.

Step S814: The L-NEF and the PCF complete QoS monitoring policy generation.

Step S816: The L-NEF sends a QoS monitoring response to the AF/EAS.

It can be learned from the foregoing step S802 to step S816 that, the NRF can discover a proper L-NEF by respectively matching the location information, application information, and service area information in the network element discovery/discover request with the location information, application information, and service area information of the L-NEF that are stored in the NRF. The discovered L-NEF can serve as a local network element and provide services for the EAS/AF. For example, when the EAS/AF needs to report QoS monitoring information, that is, needs to report QoS monitoring status, the AF does not need to initiate QoS monitoring reporting to the NEF, but can initiate QoS monitoring reporting to the discovered L-NEF, thereby speeding up the QoS monitoring reporting.

It should be noted that the device discovery and registration methods provided in the embodiments of this application may be performed by device discovery and registration apparatuses, or control modules that are in the device discovery and registration apparatuses and that are used to perform the device discovery and registration methods. In the embodiments of this application, device discovery and registration apparatuses performing the device discovery and registration methods is used as an example to describe the device discovery and registration apparatuses provided in the embodiments of this application.

Figure 9:
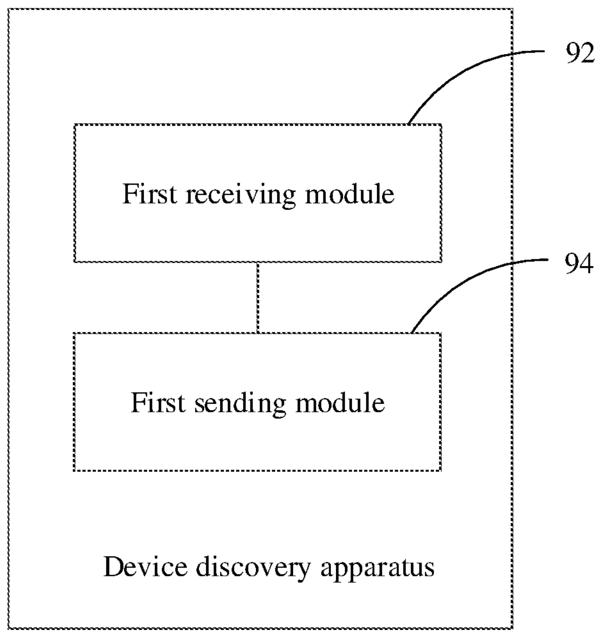
FIG. 9 is a first schematic structural diagram of a device discovery apparatus according to an embodiment of this application.

FIG. 9 is a first schematic structural diagram of a device discovery apparatus according to an embodiment of this application. The apparatus is applied to a first communication device. As shown in FIG. 9, the apparatus includes:

a first receiving module 92, configured to receive first information sent by a second communication device, where the first information includes at least one of first location information of a to-be-discovered local device and information about a first application; and a first sending module 94, configured to send first notification information to the second communication device, where the first notification information is used to notify of information about a discovered local device.

Figure 10:
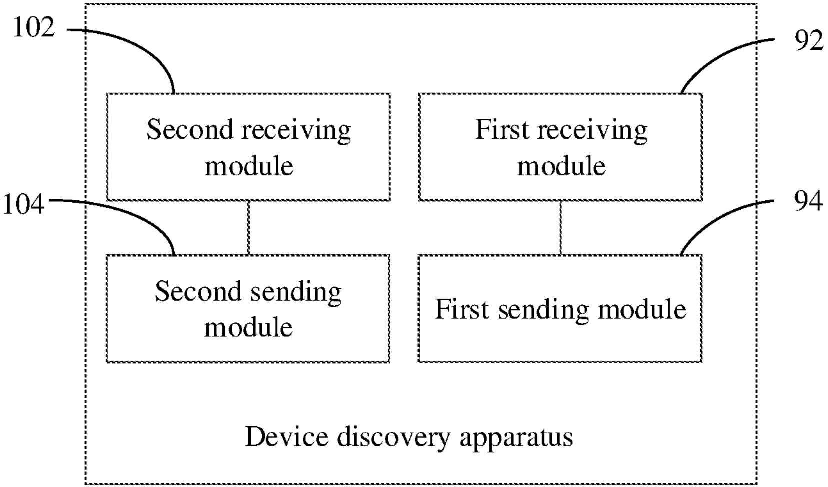
FIG. 10 is a second schematic structural diagram of a device discovery apparatus according to an embodiment of this application.

FIG. 10 is a second schematic structural diagram of a device discovery apparatus according to an embodiment of this application. As shown in FIG. 10, the apparatus may further include:

a second receiving module 102, configured to receive second information sent by a local device, where the second information includes at least one of second location information and information about a second application of a to-be-registered local device; and a second sending module 104, configured to send second notification information to the local device, where the second notification information is used to notify that the to-be-registered local device has been registered.

Optionally, the first information in this embodiment of this application includes at least one of the following: first location information and information about a first application. The first location information includes at least one of the following: location information of a terminal, location information of an application server, location information of an application function (AF), and service area information. The information about the first application is information about an application service requested for providing.

Optionally, the second information in this embodiment of this application includes at least one of the following: second location information and information about a second application. The second location information is location information of the local device. The information about a second application is information about an application service provided by the local device.

Optionally, the information about the first application and the information about the second application in this embodiment of this application each include at least one of the following: an FQDN of an application, an IP address of the application, an ID of the application, and a description of the application.

Optionally, the second location information and the location information of the terminal in this embodiment of this application each include at least one of the following: a DNAI, a TA, a cell identity, a geographical zone identifier, or a location criteria validity condition.

Optionally, the apparatus in this embodiment of this application may further include a determining module, configured to determine a to-be-discovered local device from the registered local device based on the first information and the second information.

Optionally, the first communication device in this embodiment of this application includes a network repository function (NRF). The second communication device includes at least one of the following: a network exposure function (NEF), a session management function (SMF), and a policy control function (PCF). The local device includes at least one of the following: a local network exposure function (L-NEF), a local session management function (L-SMF), and a local policy control function (L-PCF).

Figure 11:
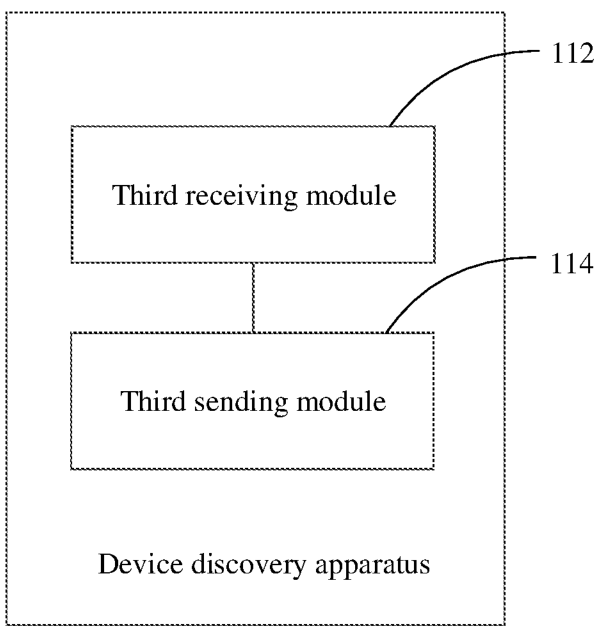
FIG. 11 is a third schematic structural diagram of a device discovery apparatus according to an embodiment of this application.

FIG. 11 is a third schematic structural diagram of a device discovery apparatus according to an embodiment of this application. The apparatus is applied to a second communication device. As shown in FIG. 11, the apparatus may include:

a third sending module 114, configured to send first information to a first communication device, where the first information includes at least one of first location information of a to-be-discovered local device and information about a first application; and a third receiving module 112, configured to receive first notification information sent by the first communication device, where the first notification information is sent by the first communication device in response to the first information, and the first notification information is used to notify of information about a discovered local device.

Optionally, the first information in this embodiment of this application includes at least one of the following: first location information and information about a first application. The first location information includes at least one of the following: location information of a terminal, location information of an application server, location information of an AF, and service area information. The information about the first application is information about an application service requested for providing.

Optionally, the information about the first application in this embodiment of this application includes at least one of the following: an FQDN of an application, an IP address of the application, an ID of the application, and a description of the application. The location information of the terminal includes at least one of the following: a DNAI, a TA, a cell identity, a geographical zone identifier, and a location criteria validity condition. The location information of the application server includes a DNAI.

Figure 12:
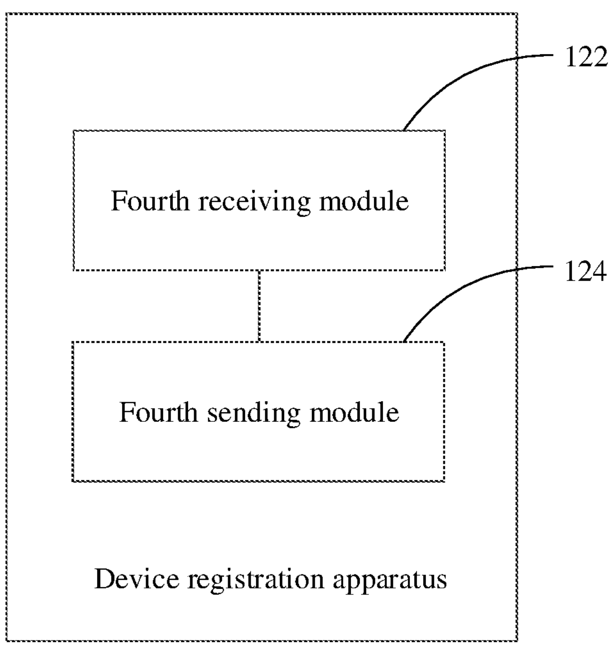
FIG. 12 is a schematic structural diagram of a device registration apparatus according to an embodiment of this application.

FIG. 12 is a schematic structural diagram of a device registration apparatus according to an embodiment of this application. The apparatus is applied to a local device. As shown in FIG. 12, the apparatus includes:

a fourth sending module 124, configured to send second information to a first communication device, where the second information includes at least one of second location information and information about a second application of a to-be-registered local device; and a fourth receiving module 122, configured to receive a second notification information sent by the first communication device, where the second notification information is sent by the first communication device in response to the second information, and the second notification information is used to notify that the local device has been registered.

Optionally, the second information in this embodiment of this application includes at least one of the following: second location information and information about a second application. The second location information is location information of the local device. The information about a second application is information about an application service provided by the local device.

Optionally, the information about the second application in this embodiment of this application includes at least one of the following: an FQDN of an application, an IP address of the application, an ID of the application, and a description of the application.

Optionally, the second location information in this embodiment of this application includes at least one of the following: a DNAI, a TA, a cell identity, a geographical zone identifier, and a location criteria validity condition.

It can be learned that the second communication device may send the first information to the first communication device, where the first information includes at least one of the first location information of the to-be-discovered local device and the information about the first application, so that the first communication device can discover the local device based on the first information. For example, the NRF can discover a corresponding local device (L-NEF) based on first information sent by the NEF, thereby implementing discovery of the local device. In this way, a problem of lack of local NEF network element discovery manners in the prior art is resolved.

Therefore, in a specific application scenario, a local device such as an L-NEF, an L-SMF, or an L-PCF can be discovered based on this application. Therefore, when QoS monitoring status needs to be reported, the AF can initiate QoS monitoring reporting to a discovered L-NEF instead of initiating QoS monitoring reporting to the NEF, thereby speeding up the QoS monitoring reporting.

The device discovery and registration apparatuses in this embodiment of this application may be apparatuses, or may be components, integrated circuits, or chips in a terminal. The apparatuses may be mobile terminals, or may be non-mobile terminals. For example, the mobile terminal may include but is not limited to the type of the terminal 11 listed above. The non-mobile terminal may be a server, a network attached storage (NAS), a personal computer (PC), a television (TV), a teller machine, or a self-service computer. This is not specifically limited in this embodiment of this application.

The device discovery and registration apparatuses in the embodiments of this application may be apparatuses having an operating system. The operating system may be an Android operating system, may be an iOS operating system, or may be another possible operating system. This is not specifically limited in the embodiments of this application.

The device discovery and registration apparatuses provided in the embodiments of this application can implement processes implemented in the method embodiments of FIG. 2 to FIG. 7, with the same technical effects achieved. To avoid repetition, details are not described herein again.

Figure 13:
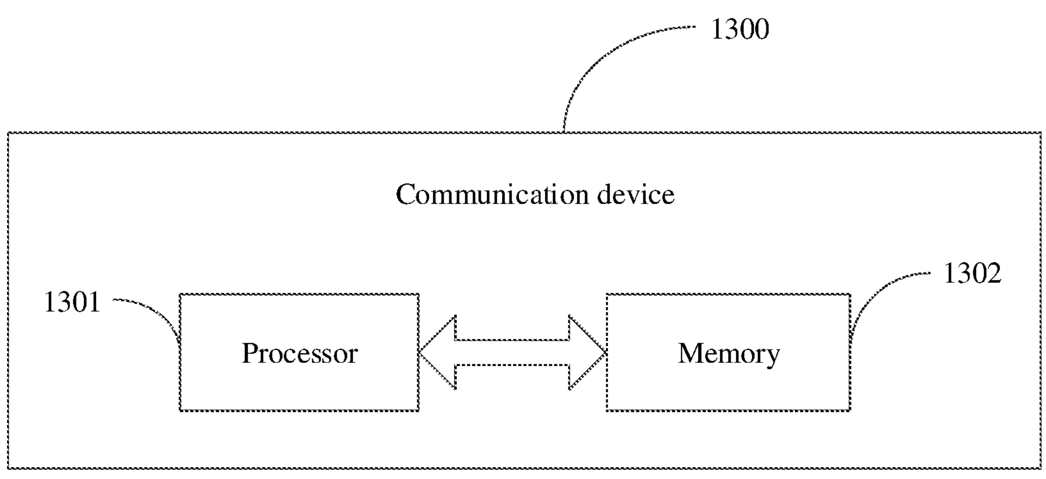
FIG. 13 is a schematic structural diagram of a communication device according to an embodiment of this application.

Optionally, as shown in FIG. 13, an embodiment of this application further provides a communication device 1300, including a processor 1301, a memory 1302, a program or instructions stored in the memory 1302 and capable of running on the processor 1301. For example, when the communication device 1300 is a terminal, the program or the instructions are executed by the processor 1301 to implement processes of the foregoing device discovery and registration method embodiments, with the same technical effects achieved. When the communication device 1300 is a network-side device, the program or the instructions are executed by the processor 1301 to implement processes of the foregoing device discovery and registration method embodiments, with the same technical effects achieved. To avoid repetition, details are not described herein again.

Figure 14:
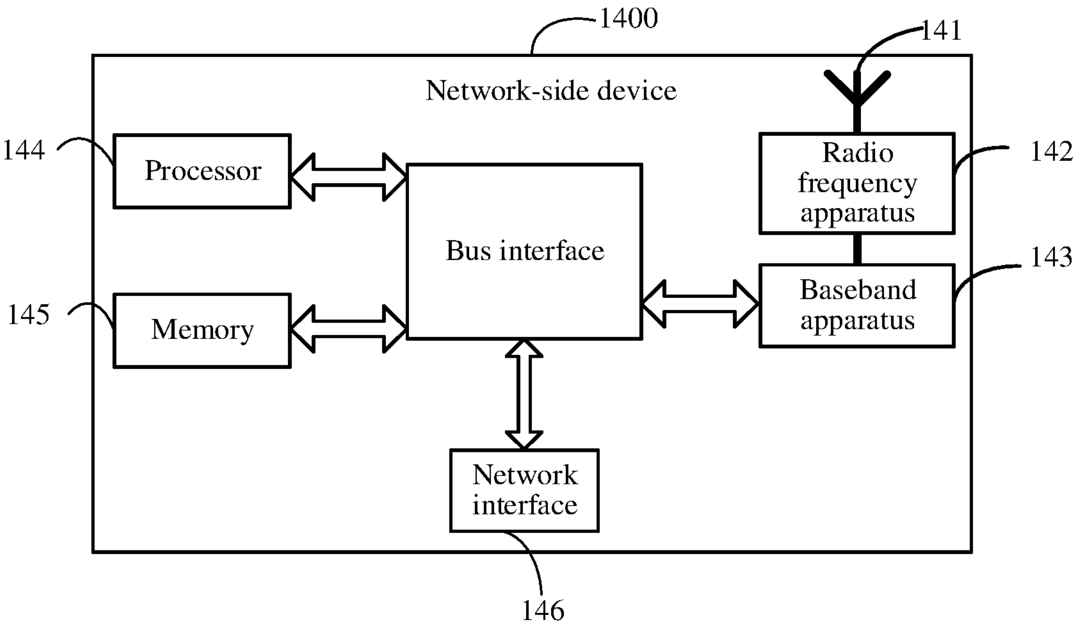
FIG. 14 is a schematic structural diagram of a network-side device according to an embodiment of this application.

Specifically, an embodiment of this application further provides a network-side device. As shown in FIG. 14, the network device 1400 includes an antenna 141, a radio frequency apparatus 142, and a baseband apparatus 143. The antenna 141 is connected to the radio frequency apparatus 142. In an uplink direction, the radio frequency apparatus 142 receives information by using the antenna 141, and transmits the received information to the baseband apparatus 143 for processing. In a downlink direction, the baseband apparatus 143 processes to-be-transmitted information, and transmits the information to the radio frequency apparatus 142; and the radio frequency apparatus 142 processes the received information and then transmits the information by using the antenna 141.

A frequency band processing apparatus may be located in the baseband apparatus 143. The method performed by the network-side device in the foregoing embodiment may be implemented by the baseband apparatus 143, and the baseband apparatus 143 includes a processor 144 and a memory 145.

The baseband apparatus 143 may include, for example, at least one baseband processing unit, where a plurality of chips are disposed on the baseband processing unit. As shown in FIG. 14, one of the chips is, for example, the processor 144, and connected to the memory 145, to invoke the program in the memory 145 to perform the operations of the network device shown in the foregoing method embodiments.

The baseband apparatus 143 may further include a network interface 146, configured to exchange information with the radio frequency apparatus 142, where the interface is, for example, a common public radio interface (CPRI).

Specifically, the network-side device in this embodiment of the present disclosure further includes instructions or a program stored in the memory 145 and capable of running on the processor 144. The processor 144 invokes the instructions or program in the memory 145 to perform the methods executed by the modules shown in FIG. 9 to FIG. 12, with the same technical effect achieved. To avoid repetition, details are not described herein again.

An embodiment of this application further provides a readable storage medium, where the readable storage medium stores a program or instructions, and when the program or instructions are executed by a processor, the processes of the foregoing device discovery and registration method embodiments are implemented, with the same technical effects achieved. To avoid repetition, details are not described herein again.

The processor is a processor in the terminal in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement processes of the foregoing device discovery and registration method embodiments, with the same technical effects achieved. To avoid repetition, details are not described herein again.

It should be understood that the chip mentioned in this embodiment of this application may also be referred to as a system-level chip, a system chip, a chip system, or a system-on-chip.

It may be understood that the embodiments described in this disclosure may be implemented by hardware, software, firmware, middleware, microcode, or a combination thereof. For hardware implementation, a module, a unit, a sub-module, a sub-unit, or the like may be implemented in one or more application-specific integrated circuits (ASIC), digital signal processors (DSP), digital signal processing devices (DSPD), programmable logic devices (PLD), field-programmable gate arrays (FPGA), general-purpose processors, controllers, microcontrollers, microprocessors, and other electronic units for performing the functions described in this application, or a combination thereof.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In the absence of more restrictions, an element defined by "including a . . . " does not exclude another same element in a process, method, article, or apparatus that includes the element. In addition, it should be noted that the scope of the method and apparatus in the embodiments of this application is not limited to performing a function in a sequence shown or discussed, and may further include performing a function in a basically simultaneous manner or in a reverse sequence based on a function involved. For example, the described method may be performed in a different sequence, and various steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing implementations. The foregoing implementations are only illustrative rather than restrictive. Inspired by this application, persons of ordinary skill in the art can still derive many variations without departing from the essence of this application and the protection scope of the claims. All these variations shall fall within the protection of this application.

What is claimed is:

1. A device discovery method, comprising:

receiving, by a network repository function (NRF), first information sent by a network exposure function (NEF), wherein the first information comprises first location information of a to-be-discovered local network exposure function (L-NEF), the first location information comprises service area information, and the service area information comprises at least one of the following: a data network access identifier (DNAI), a tracking area (TA), a cell identity, a geographical zone identifier, or a location criteria validity condition;

receiving, by the NRF, second information sent by a to-be-registered L-NEF, wherein the second information comprises second location information of the to-be-registered L-NEF;

sending, by the NRF, second notification information to the to-be-registered L-NEF, wherein the second notification information is used to notify that the to-be-registered L-NEF has been registered;

determining, by the NRF, a discovered L-NEF from the registered L-NEF based on the first information and the second information, wherein the discovered L-NEF is a L-NEF of which the second location information matches the first location information; and sending, by the NRF, first notification information to the NEF, wherein the first notification information is used to notify of information about the discovered L-NEF;

wherein the second location information comprises at least one of the following: a data network access identifier (DNAI), a tracking area (TA), a cell identity, a geographical zone identifier, or a location criteria validity condition.

2. The method according to claim 1, wherein the first information further comprises at least one of the following:

location information of a terminal, location information of an application server, or location information of an application function (AF).

3. The method according to claim 1, wherein the second location information is location information of the L-NEF.

4. A non-transitory readable storage medium, wherein the readable storage medium stores a program or instructions, and the program or instructions are executed by the processor to implement the steps of the device discovery method according to claim 1.

5. A device discovery method, comprising:

sending, by a network exposure function (NEF), first information to a network repository function (NRF), wherein the first information comprises first location information of a to-be-discovered local network exposure function (L-NEF), the first location information comprises service area information, the service area information comprises at least one of the following: a data network access identifier (DNAI), a tracking area (TA), a cell identity, a geographical zone identifier, and a location criteria validity condition; and receiving, by the NEF, first notification information sent by the NRF, wherein the first notification information is sent by the NRF in response to the first information, and the first notification information is used to notify of information about a discovered L-NEF.

6. The method according to claim 5, wherein the first information further comprises at least one of the following:

location information of a terminal, location information of an application server, or location information of an AF.

7. A non-transitory readable storage medium, wherein the readable storage medium stores a program or instructions, and the program or instructions are executed by the processor to implement the steps of the device discovery method according to claim 5.

8. A device registration method, comprising:

sending, by a local network exposure function (L-NEF), second information to a network repository function (NRF), wherein the second information comprises second location information of a to-be-registered L-NEF, the second location information comprises at least one of the following: a data network access identifier (DNAI), a tracking area (TA), a cell identity, a geographical zone identifier, and a location criteria validity condition; and receiving, by the L-NEF, a second notification information sent by the NRF, wherein the second notification information is sent by the NRF in response to the second information, and the second notification information is used to notify that the L-NEF has been registered.

9. The method according to claim 8, wherein the second location information is location information of the L-NEF.

10. A non-transitory readable storage medium, wherein the readable storage medium stores a program or instructions, and the program or instructions are executed by the processor to implement the steps of the device discovery method according to claim 8.

* * * * *